United States Patent [19]

Dumke

[11] Patent Number: 5,680,882
[45] Date of Patent: Oct. 28, 1997

[54] WATERLINE INJECTION NOZZLE APPARATUS

[76] Inventor: Ralph W. Dumke, 10 Oak Hill Rd., Kingston, N.H. 03848

[21] Appl. No.: 222,889

[22] Filed: Apr. 5, 1994

[51] Int. Cl.$^6$ ............................................. F16L 37/28
[52] U.S. Cl. ......................... 137/614.2; 137/614.04; 137/320
[58] Field of Search ........................ 137/614, 317, 137/315, 320, 614.2, 614.04, 614.02, 614.21; 251/148, 155; 73/863.86, 863.81, 862.85, 863.03; 285/33, 316; 239/407, 580, 581.1, 586

[56] References Cited

U.S. PATENT DOCUMENTS

| | | | |
|---|---|---|---|
| 1,181,910 | 5/1916 | McGilvray | 137/317 X |
| 2,795,438 | 6/1957 | Oetiker | 285/33 |
| 3,036,590 | 5/1962 | Knox | 137/315 |
| 3,041,088 | 6/1962 | Brandon, Jr. | 285/33 |
| 3,128,785 | 4/1964 | Krummel | 137/315 |
| 3,460,765 | 8/1969 | Lord | 137/315 X |
| 3,589,388 | 6/1971 | Haneline, Jr. | 137/315 |
| 4,469,122 | 9/1984 | Meek | 137/315 X |
| 4,631,961 | 12/1986 | Yohe et al. | 73/863.85 X |
| 4,855,668 | 8/1989 | Crow | 73/863.86 X |
| 5,049,492 | 9/1991 | Sauer et al. | 73/863.86 X |
| 5,161,417 | 11/1992 | Strong et al. | 73/863.86 |

*Primary Examiner*—Kevin Lee
*Attorney, Agent, or Firm*—William B. Ritchie

[57] ABSTRACT

A waterline injection nozzle for introducing water treatment chemicals within a high pressure waterline. The apparatus has a quick disconnect fitting attached to a non-corrosive stainless nozzle assembly. Within the nozzle assembly is an integral ball valve. The apparatus can be disconnected from the waterline with both the flow of chemical solution and the water from the waterline prevented from spraying or leaking. The integral ball valve in the nozzle assembly serves to depressurize the quick release fitting, so that it can be easily and quickly reconnected. A one-way flapper valve that prevents water flowing from the waterline to the chemical reservoir is also provided.

3 Claims, 6 Drawing Sheets

WATERLINE INJECTION NOZZLE APPARATUS

BACKGROUND OF THE INVENTION

1. Field of the Invention

The invention relates to chemical injection equipment for water treatment facilities.

2. Description of the Related Art

A modern water treatment facility requires the ability to inject various chemical solutions into the water in order to make the water suitable for residential and commercial use. The most commonly injected substance is chlorine which functions as a bactericide. However, the use of soda ash and potassium hydroxide to control the pH of the water, with the acid rain problem that effects most water supplies, has become equally as important. Other chemicals such as fluoride are a part of the list. All of the chemicals injected are extremely corrosive and must be handled in a careful manner.

Typically, these chemicals are injected into the water through a nozzle assembly as shown in FIG. 1. Corporation and Stop Assembly 50, such as provided by the Liquid Metronics Division of Milton Roy Corporation, is attached to a water main 12 (shown in FIG. 2) via bushing 52. Pipe 54 acts as a nozzle 55 which extends into main 12 and serves to inject the desired chemical into the water stream. Pipe 54 is typically polypropylene or butylene plastic. Connected to bushing 52 is corporation stop 64. Once pipe 54 is removed, stop 64 can be closed to prevent water exiting from main 12. Reducer fitting 66 is used to attach stop 64 to clamp assembly 62. Clamp 60 is tightened onto pipe 54 which determines the length of nozzle 55 that is to extend into main 12. A water tight seal is obtained by tightening fitting 66 to clamp assembly 62, thus causing packing 70 and washer 68 to seal against pipe 54 and the surrounding fittings. The threaded components of this apparatus are fitted together using pipe thread sealant and tightened to 20 foot-pounds. A safety line (not shown) must be attached to the device. The purpose of the safety line is several fold. Plastic pipe 54 often breaks and the pressure within the line would cause the broken end to whip around. Also, nozzle may suddenly jerk out pulling the safety cable tight against the nozzle when attempting to remove the nozzle from the water main before stop 64 can be shut-off usually spraying water and chemicals.

Using the prior art apparatus, it is impossible to stop the flow of water from the main until nozzle has been removed so that the corporation stop 64 can be closed. During that time, water and chemical will be spraying around the area, presenting an additional hazard to the workmen in the facility. Also, the type of fittings used results in numerous leaks as the fittings can only be hand tightened as over-tightening can crack the plastic pipe.

A waterline injection nozzle apparatus that can be removed without the operator being sprayed is not found in the prior art.

SUMMARY OF THE INVENTION

It is an object of the invention to provide a waterline injection nozzle apparatus that is resistant to breakage.

It is another object of the invention to provide a waterline injection nozzle apparatus that can be shut off without removing the nozzle from the waterline.

It is still another object of the invention to provide a waterline injection nozzle apparatus that substantially increases the safety for employees in water treatment facilities.

Another object of the invention is to provide a waterline injection nozzle apparatus where the injection line can be replace by merely disconnecting the water injection line from its nozzle while the nozzle remains within the water line.

Another object of the invention is to provide a waterline injection nozzle apparatus that utilizes metallic parts that are highly resistant to breakage and corrosion.

It is another object of the invention to provide a waterline injection nozzle apparatus that can be firmly tightened so that leaks can be virtually eliminated.

It is another object of the invention to provide a waterline injection nozzle apparatus that includes a check valve so that water cannot flow from the water main to the chemical injection reservoir.

Finally, it is an object of the invention to provide a waterline injection nozzle apparatus that can stop water and chemical flow in both directions without removing the nozzle from the water main and so flow stoppage can be quick.

The invention is an injection nozzle apparatus for injecting a flow of chemical solution within a water flow in a waterline. A nozzle assembly having an integral nozzle adapted to fit inside the waterline is provided. The nozzle assembly also has an integral ball valve and a first section of a quick disconnect fitting. A second section of a quick disconnect fitting is provided, with said second section corresponding to said first section, wherein said first section is releasably connected to said second section, whereby, releasing said first section from said second section shuts off both the chemical solution injection flow and prevents the water flow within the waterline from exiting back through said nozzle. A one-way flapper valve placed adjacent to said second section is provided wherein flow through said flapper valve can proceed only in the direction towards the waterline. All materials including said nozzle assembly are non-corrosive stainless steel.

DETAILED DESCRIPTION OF THE INVENTION

Figure 1:
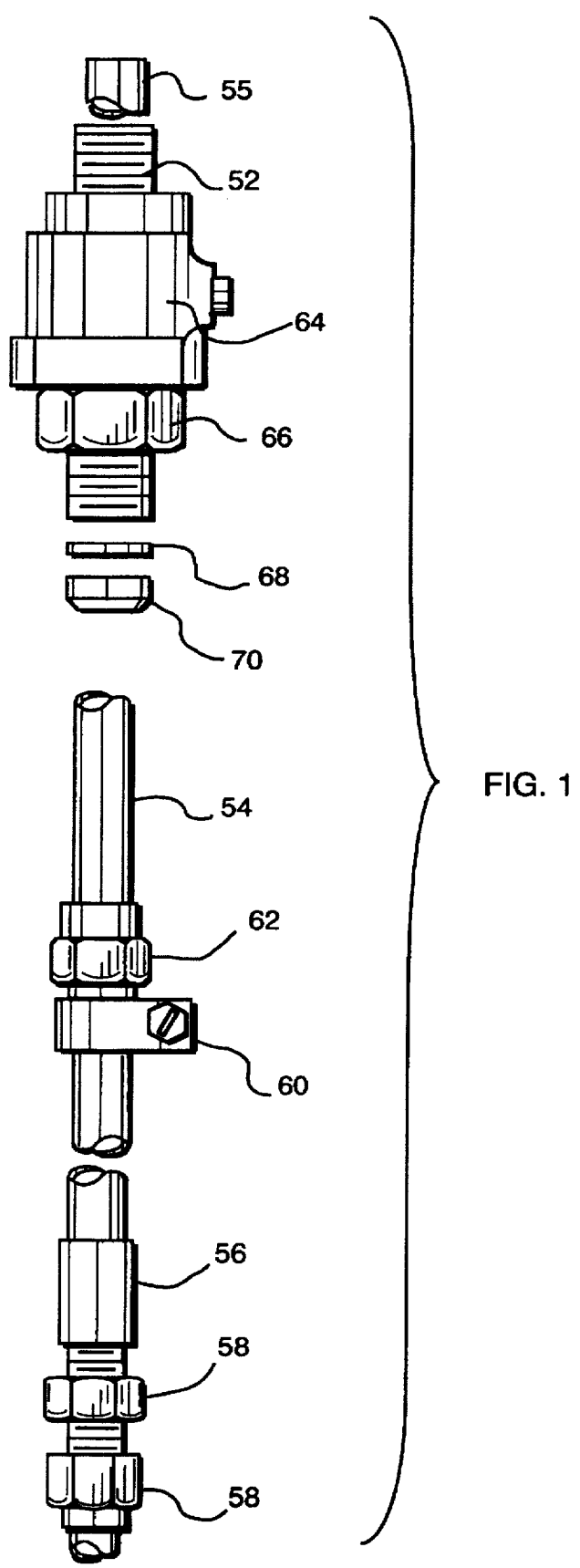
FIG. 1 is an exploded view of a typical prior art waterline injection nozzle apparatus.
Figure 2:
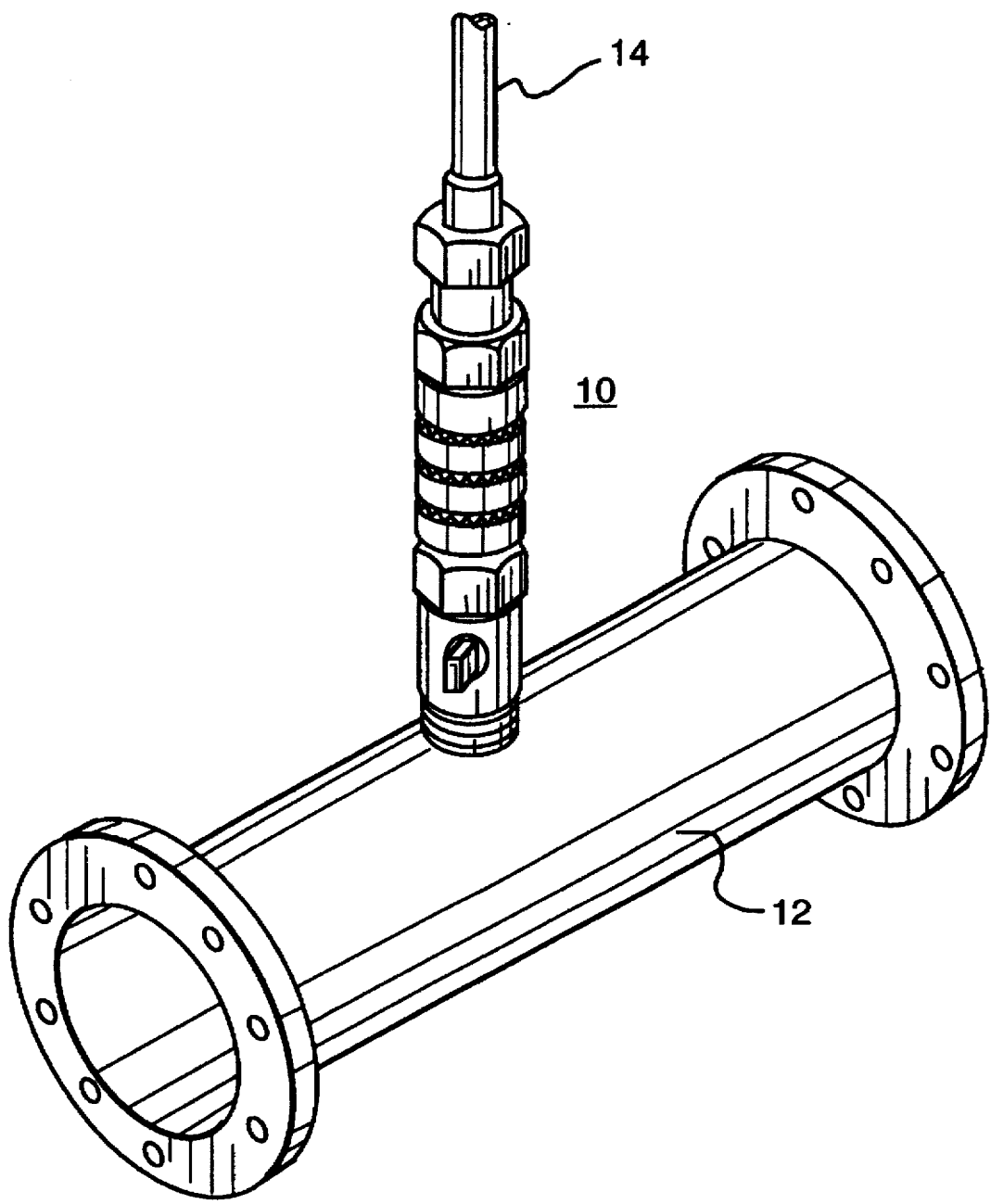
FIG. 2 is an isometric view of the waterline injection nozzle apparatus installed in a waterline.

FIG. 2 is an isometric view of the waterline injection nozzle invention 10 installed in water main 12. Due to the inherent safety of this design, the need for safety line (not shown) in the prior art device in FIG. 1 is unnecessary. Invention 10 will fit directly into the standard threaded opening provided in main 12. Invention is then connected via pipe 14 to a reservoir or chemical feed pump (not shown) which holds the chemicals that are to be injected into the water flowing in main 12.

Figure 3:
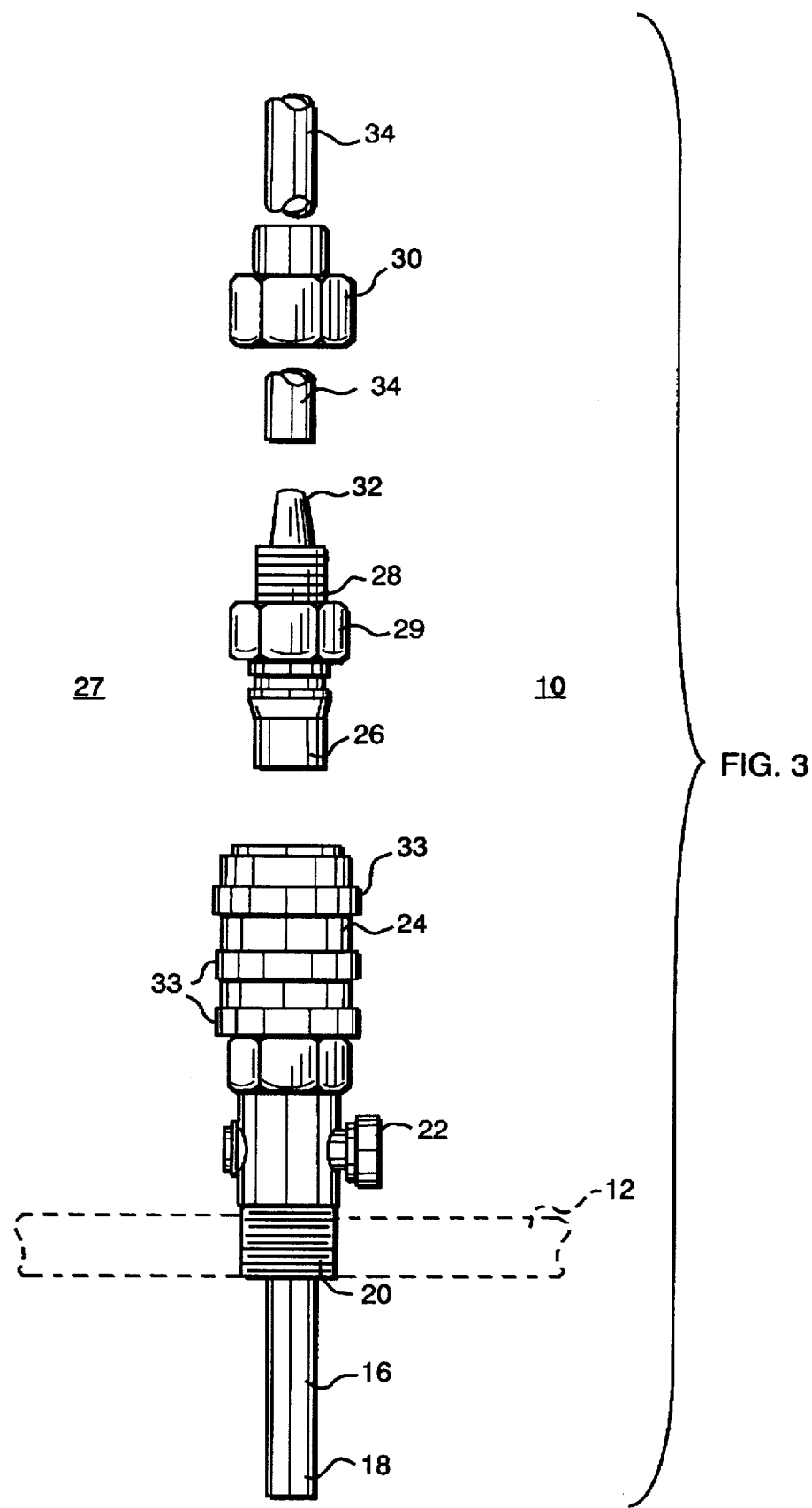
FIG. 3 is an exploded view of the waterline injection nozzle apparatus in accordance with the invention.

FIG. 3 is an exploded view of invention 10. Nozzle assembly 16 is threaded into main 12 via threads 20. Nozzle 18, which is preferably an integral part of assembly 16 extends into main 12, thereby permitting injecting chemicals into the water as it flows within main 12. Within assembly 16 is housed ball valve 22. Ball valve 22 is required when there is more than 100 psi in pipe 12, since an operator would have difficulty in putting the quick disconnect fitting back together unless the fitting was isolated from the pressure in pipe 12.

Assembly 16 is completed by quick disconnect female section 24. Therefore, once assembly 16 is inserted within main 12, it should be turned on or off via valve 22 without water leaking from main 12. All fittings are preferably "302 cres" or "304 cres", that is corrosion resistant stainless steel. The quick disconnect fitting is preferably of the type manufactured by Martin Special Products, Inc.

The chemical reservoir or pump (not shown) can then be connected via male assembly 27 to assembly 16. Plastic tubing 34 is connected to quick disconnect male section 29. Note that male assembly 27 and female section could be switched, that is, so the male assembly 27 is a part of assembly 16 and the female section is used to connect the reservoir tube to assembly 16. Plastic tubing 34 is sealed onto section 29 by slipping the tubing over coupling post 32 and then locking compression nut 30 onto threaded section 28 to ensure a water tight fit. In order to connect the reservoir to main 12, an operator merely has to snap nipple 26 into section 24. To disconnect, pull back on knurled sections 33, and male assembly 27 is free from main 12 without having water or chemicals spray around the water treatment facility.

Figure 4:
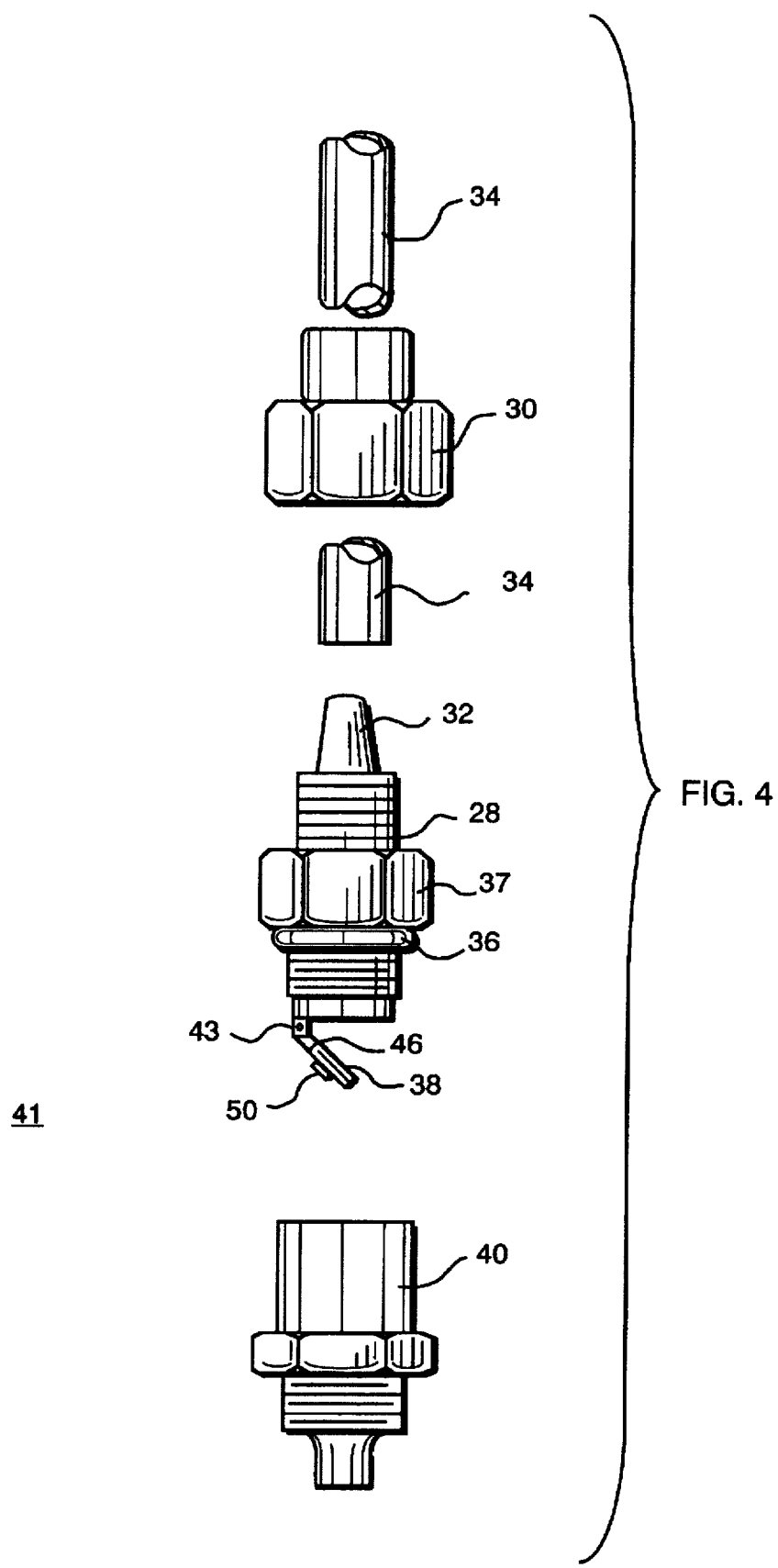
FIG. 4 is an alternative embodiment of the waterline injection nozzle apparatus that stops water from flowing back toward the chemical reservoir.

FIG. 4 is an alternative embodiment of invention 10 that can stop flow from main 12 to the chemical injection reservoir in the event that pressure becomes lower in the reservoir system that feeds the water line, i.e., the plastic tubing ruptures. The set up is essentially the same except check valve assembly 41 is inserted in the line between nipple 26 and chemical reservoir. As shown, check valve assembly is preferably a part of the quick disconnect section, either the male section if configured as shown, or the female section, if configured in the reverse position as discussed. Flapper valve assembly 38 serves as a one way valve so that water containing the chemical can flow only in the direction of arrow A. Housing 40 is sealed via O-ring 36 to flapper valve housing 37 when housing 37 is threaded into housing 40.

Figure 5:
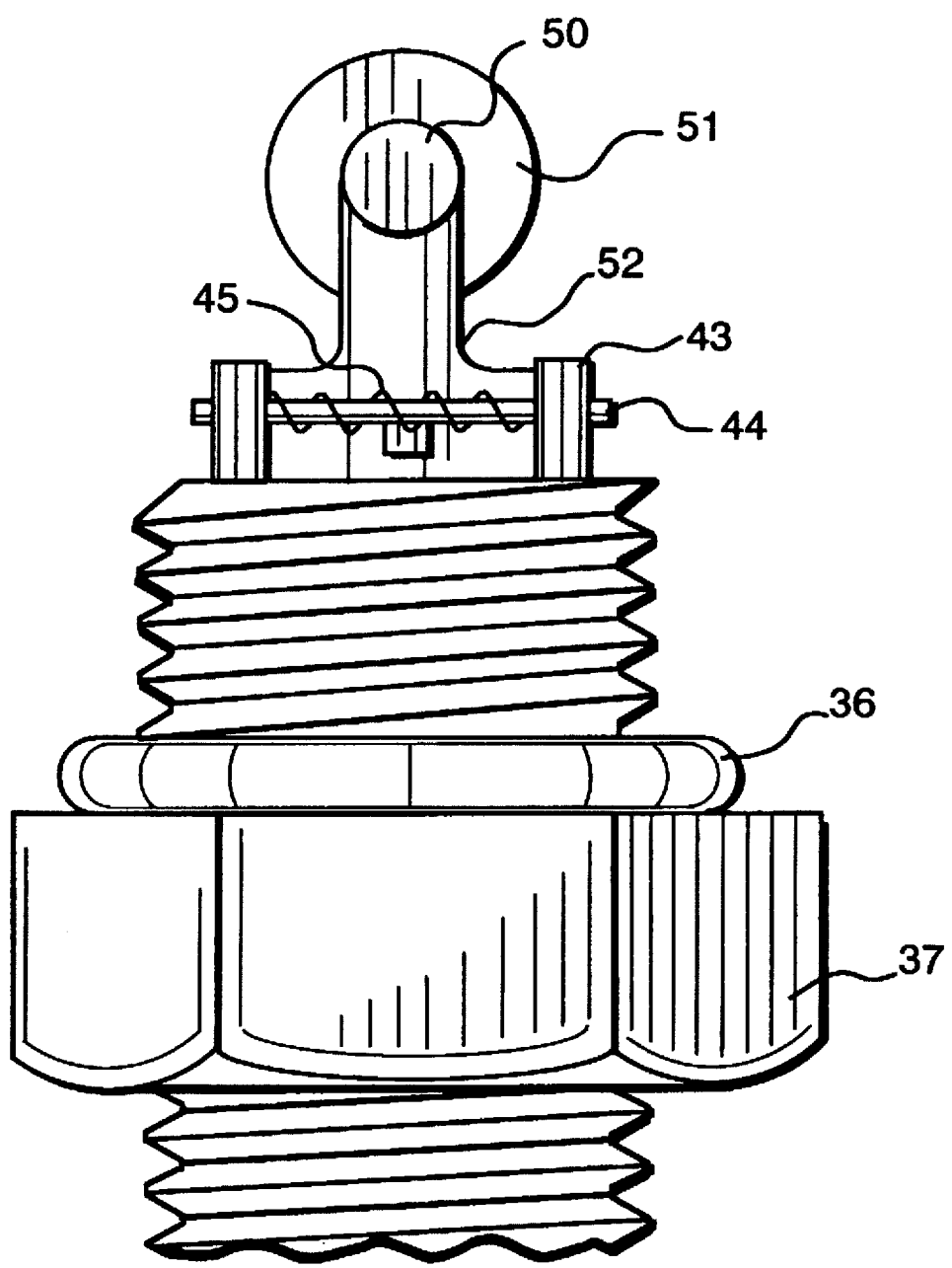
FIG. 5 is a detailed view of one way check valve assembly.
Figure 6:
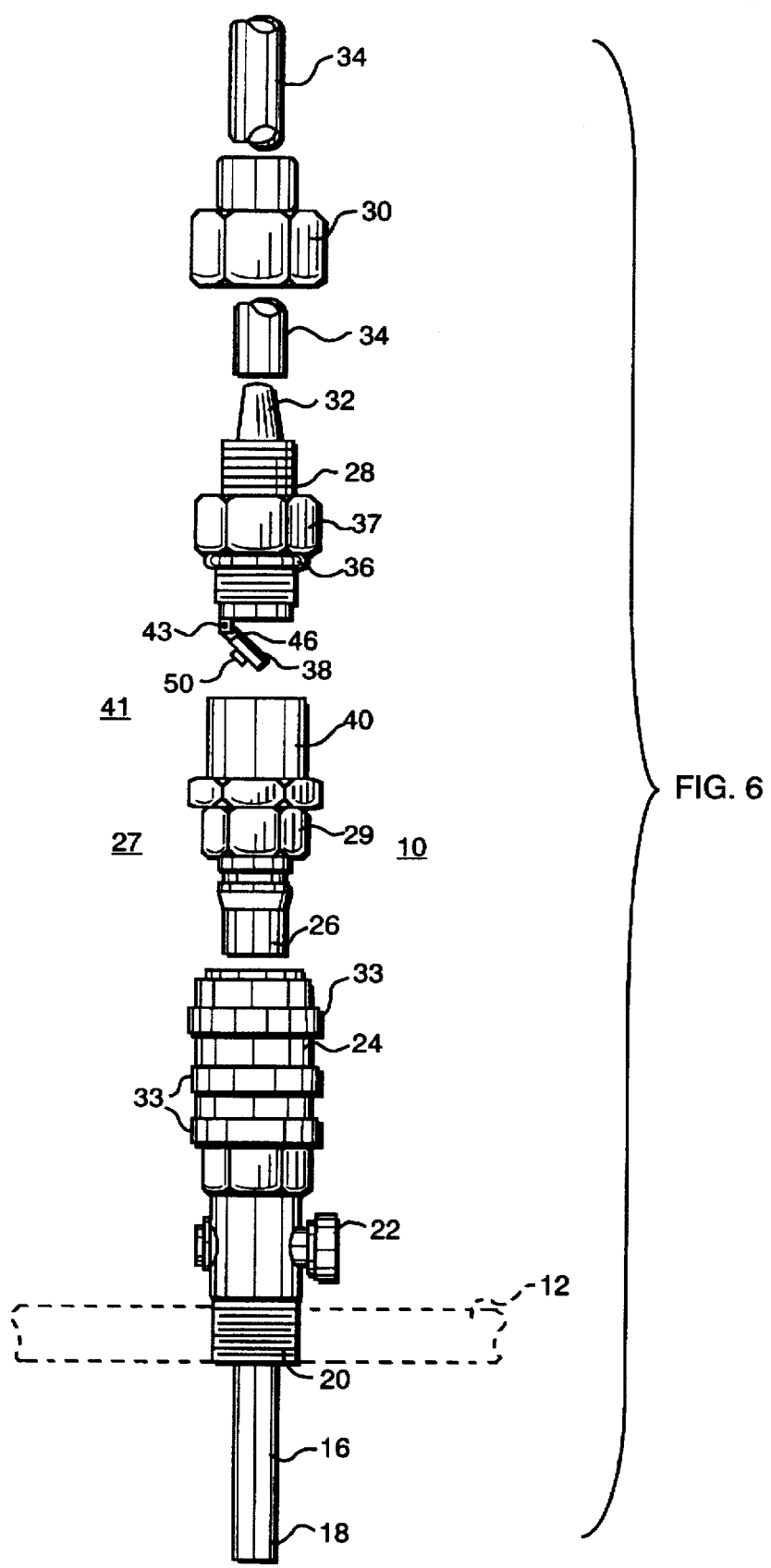
FIG. 6 is an exploded view of the alternative embodiment of the waterline injection nozzle apparatus with the one way check valve assembly in position.

FIG. 5 is a detailed view of one way check valve assembly 41. Metal disk 51 is attached to assembly 38 via pin 50. Pin 50 also holds sealing disk 46 against metal disk 51. Sealing disk 46 rests against a seat (not shown) that effectively seals against water flowing from main 12 towards the chemical reservoir. Disk 51 is pivotly attached to axle 44 via hinge 52. Axle 44 is held between posts 43. Spring 45 causes hinge 52 and attached disk 51 to be urged against the valve seat (not shown) when there is no water flow in the direction of arrow A (shown in FIG. 4) thus preventing water from flowing towards the chemical reservoir.

While there have been described what are at present considered to be the preferred embodiments of this invention, it will be obvious to those skilled in the art that various changes and modifications may be made therein without departing from the invention and it is, therefore, aimed to cover all such changes and modifications as fall within the true spirit and scope of the invention.

What is claimed is:

1. An injection nozzle apparatus for injecting a flow of chemical solution within a water flow in a waterline comprising:

a nozzle assembly having an integral nozzle dimensioned to fit inside the waterline, an integral ball valve, threaded means for connecting said nozzle assembly to the waterline and a first section of a quick disconnect fitting;

a second section of a quick disconnect fitting, with said second section corresponding to said first section, wherein said first section is releasably connected to said second section, with said quick disconnect fitting adapted to be quickly disconnectable without the use of tools, whereby, releasing said first section from said second section shuts off substantially instantaneously the chemical solution injection flow and prevents the water flow within the waterline from exiting back through said nozzle.

2. The apparatus of claim 1 further comprising a one-way flapper valve placed adjacent to said second section wherein flow through said flapper valve can proceed only in the direction towards the waterline.

3. The apparatus of claim 2 wherein said nozzle assembly is non-corrosive metal.

* * * * *